Figure 1:
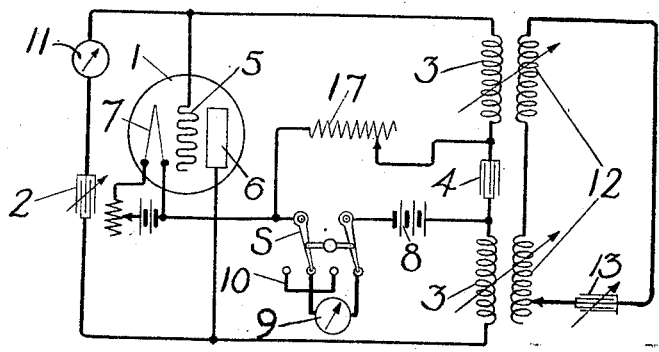

April 6, 1926.

R. A. HEISING

RESONANCE INDICATOR

Filed August 17, 1920

1,579,935

Inventor:
Raymond A. Heising
by C. A. Sprague. Atty.

Patented Apr. 6, 1926.

1,579,935

UNITED STATES PATENT OFFICE.

RAYMOND A. HEISING, OF EAST ORANGE, NEW JERSEY, ASSIGNOR TO WESTERN ELECTRIC COMPANY, INCORPORATED, OF NEW YORK, N. Y., A CORPORATION OF NEW YORK.

RESONANCE INDICATOR.

Application filed August 17, 1920. Serial No. 404,257.

*To all whom it may concern:*

Be it known that I, RAYMOND A. HEISING, a citizen of the United States, residing at East Orange, in the county of Essex and State of New Jersey, have invented certain new and useful Improvements in Resonance Indicators, of which the following is a full, clear, concise, and exact description.

The present invention relates to resonance indicators and more particularly to methods of and means for measuring the natural frequency or wave length of oscillatory circuits or indicating their resonance condition. It includes methods and means whereby these objects may be accomplished with greater accuracy and convenience than with instruments now in use.

The invention makes use of a principle which is inherent in vacuum tube circuits, but the significance of which has not heretofore been recognized. With frequency measuring devices now in use it is necessary to excite an oscillatory circuit and note its response by means of an indicator associated with the circuit. Such a variable oscillatory circuit with an indicator constitutes the ordinary wave meter. Where it is desired to measure the natural period of a receiving circuit which has no source of oscillations, it is necessary to provide a special source. According to the present invention an oscillator of the vacuum tube type may be used to perform both functions, that is, of the exciting source and of the variable oscillatory circuit. Since an amplifier of the vacuum tube type, coupled to an oscillator, constitutes with it a source of amplified oscillations, it is possible to use such a combination in the same general manner. This permits the frequency measuring apparatus to be much simplified, in that the oscillatory circuit and the exciting source are combined. This principle enables the resonance condition to be determined with greater accuracy than by the use of an indicator in the usual wave meter circuit.

It has been observed that a current indicator in the circuit of an oscillator indicates very critically the condition of resonance between the oscillator and a tuned circuit to which it is supplying power. The indicator may be either in the space current supply circuit or in the alternating current circuit of the oscillator. In the space current circuit a direct current milliammeter, which is always preferable to an alternating current meter, may be used and the condition of resonance will be indicated by a sudden throw of the needle in one direction e. g. the direction of increased current. In the alternating current path, an alternating current indicator must, of course, be used and when the condition of resonance is reached there will be a sudden throw of the needle in the other direction e. g. the direction of decreased current.

An object of the invention is to utilize the principle of current variation in the circuits of a vacuum tube supplying alternating current in order to enable frequency and wave length determinations to be made with simplicity, convenience and accuracy.

Figure 2:
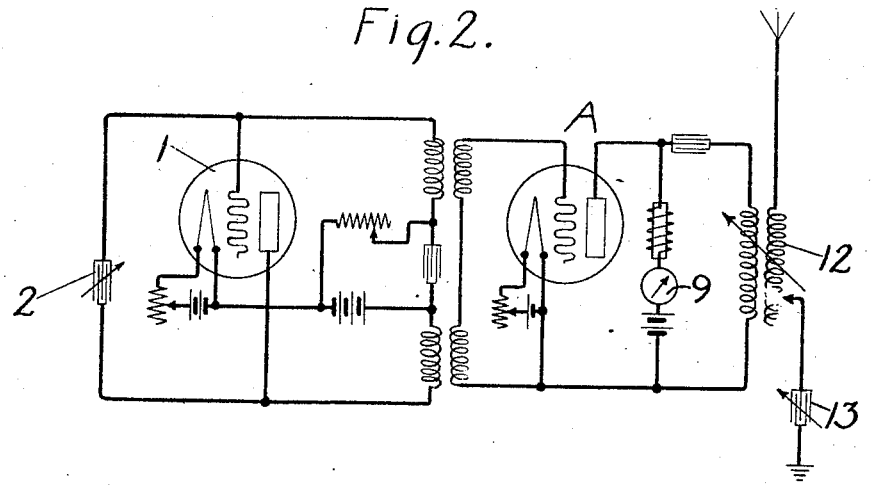

The invention may be understood from the following description taken in connection with the drawing, in which Figures 1 and 2 show typical circuit arrangements embodying the invention,—Figure 1 illustrating the use of a vacuum tube oscillator, and Figure 2 the use of the combined oscillator and amplifier unit for frequency determination.

In Figure 1 there is shown an oscillator of well known type comprising a thermionic discharge device 1, having an oscillatory circuit comprising a variable capacity element 2, inductances 3, and large capacity 4. The discharge device has its grid 5 and plate 6 connected to opposite terminals of the capacity 2 and its hot cathode 7 connected to the terminal of capacity element 4, which is electrically most remote from the grid. The cathode is conductively connected to the grid through a variable resistance 17, which enables the amplitude of the generated oscillations to be controlled. The space current path of the device may be traced from the plate 6 by way of an inductance 3, space current source 8, and switch S through a direct current indicator 9 or a connector 10, back to the cathode 7. Such an arrangement produces oscillations of the natural frequency of the oscillatory circuit 2, 3, 4, 3, which may be varied by varying the magnitude of the capacity of element 2. An alternating current indicator 11 may be connected directly in this oscillatory circuit. The invention is not dependent upon any particular type of oscillator circuit and it will be understood that the circuit illustrated is merely one form of a number of circuits to which the invention is applicable. A circuit represented herein as a closed loop, comprising inductances 12 and variable capacity 13, is shown coupled to the inductances 3 of the oscillator. This closed loop circuit may typify an antenna, or any oscillatory circuit the natural frequency of which is to be determined.

The circuit of Figure 1 will serve to illustrate several ways in which the invention may be used in practice and will thereby indicate the advantages of the invention.

The oscillator may, for example, be one of general application, such as is used in laboratories, and it may be desired to set the oscillator at a given frequency. In such a case the direct current milliammeter 9 may be permanently connected in the space current supply circuit or there may be a telephone jack or a switch connection, as illustrated to enable the indicator to be readily inserted for a brief time. A calibrated tuned circuit or a circuit having a fixed natural frequency at which the oscillator is to be set, as for example, an oscillatory circuit 12, 12, 13, is now brought into inductive relation with the oscillator. If the oscillatory circuit is that of a wave meter, it is set in the usual way as by varying the condenser 13 to give the circuit the desired natural frequency. Then by varying the condenser 2 the frequency of the oscillator may be varied, and the milliammeter 9 will give a sharply defined indication when the point of resonance is reached, that is, when the oscillations produced by the oscillator are of a frequency which is the same as the natural frequency of the oscillatory circuit. This will enable resonance to be determined with greater accuracy than with the usual hot wire instrument or thermo-couple and galvanometer of the ordinary wave meter.

Instead of the conditions above assumed, suppose for example that the oscillator circuit has been calibrated so that the condenser 2 gives frequency or wave length readings directly. Such an arrangement is convenient for measuring the frequencies of resonant circuits of all sorts, whether or not they have means for exciting them. If it is desired to measure the frequency of the circuit 12, 12, 13, which may represent an antenna, the oscillator is brought into inductive relation with the circuit 12, 12, 13 and the condenser 2 is varied until the indicator 9 gives a sudden changed indication, the corresponding condenser reading giving the frequency or wave length of the circuit 12, 12, 13 directly. If the apparatus is suitably calibrated, or if the circuit 12, 12, 13 is to be set at a given frequency, its constant may be varied until the reading on the instrument 9 suddenly changes, the oscillator circuit having previously been set at a desired frequency.

If two or more separate circuits are to be set at the same frequency, it may be noted that no calibration is necessary. The oscillator is coupled to one of the circuits and is set at the frequency of the circuit. The oscillatory is then coupled to another of the circuits, which in turn is set at the oscillator frequency.

Other uses will no doubt occur to those skilled in the art, but it is believed that those which have been indicated will serve to make clear the general nature of the invention.

Instead of using the milliammeter 9 in the space current circuit to determine the resonant condition, the alternating current instrument 11 in the oscillator circuit may be used. It should, of course, be understood that this instrument may be supplied with switching connections such as those described in connection with milliammeter 9. In operation, the alternating current indicator 11, as has been previously stated, indicates resonance by a sudden deflection or change in its indication. The use of these circuits with the instrument 11 will be clear from the foregoing explanation, it being understood that the direct current meter 9 is preferred.

The circuit of Figure 2 differs from that of Figure 1 mainly in having the indicating instrument 9 in the space current branch of a vacuum tube amplifier A connected to the output circuit of the oscillator. The oscillatory circuit, which is of the same character as the circuit 12, 12, 13 of Figure 1, is illustrated in Figure 2 as an antenna coupled to the output alternating current path of the amplifier. The amplifier, in addition to increasing the power delivered to the load circuit 12, 13, prevents the load from reacting upon the oscillator, so that the period of the oscillator is quite independent of the circuits to be measured. The circuit of Figure 2 is, in general, capable of the same uses as the circuit of Figure 1 and the manner of using it is the same as that described in connection with Figure 1.

It should be understood that the invention is not restricted to the particular circuit arrangements which have been illustrated and described, but only by the scope of the appended claims.

What is claimed is:

1. The method of adjusting a system including two coupled circuits, one of which circuits is a vacuum tube oscillation generator circuit, which comprises measuring the space current of the vacuum tube, varying the tuning of one of the circuits, and utilizing the space current measurements to determine the condition of resonance between the circuits.

2. The method of matching the frequency of an oscillation supply circuit having a source of direct current and that of a load circuit each to each, which comprises connecting said oscillation supply circuit to said load circuit in energy supply relation, varying the natural frequency of one of said circuits and utilizing the relation between the variation of the direct current from said direct current source in said oscillation supply circuit and the variation of frequency of the varied circuit to determine the condition of resonance between said circuits.

3. The method of measuring the natural period of a circuit, which comprises associating said circuit in energy transfer relation with an oscillatory circuit of known period having a direct current supply, one of said circuits being an oscillation generating circuit, varying the period of at least one of the circuits to bring the circuits into resonance, producing indications of the direct current supplied to said oscillation generating circuit, and utilizing said indications to determine the condition of resonance between said circuits.

4. The method of resonating an oscillation generating circuit of the type employing a space discharge device and an oscillatory circuit, which method comprises associating said circuits in energy transfer relation with each other and varying the frequency of one of said circuits until the space current of the oscillation generator undergoes a sudden change in value thereby indicating the condition of resonance between said oscillation generator and said oscillatory circuit.

5. The method of setting a plurality of separate oscillation circuits all to the same frequency which comprises referring each in succession to the frequency of a space discharge oscillation generator, adjusting the frequency of each oscillation circuit to resonance with said oscillation generator and determining the condition of resonance from the changes in the space current of said generator which accompany the changes in the frequency adjustments of said oscillation circuits.

6. The method of measuring the frequency or wave length of an oscillatory circuit which comprises associating said circuit in energy transfer relation with a space discharge oscillation generator of known characteristics and bringing said circuit and oscillator into resonance as indicated by a rapid change in the space current of said oscillator.

In witness whereof, I hereunto subscribe my name this 11th day of August A. D., 1920.

RAYMOND A. HEISING.